(12) United States Patent
Tang et al.

(10) Patent No.: US 12,215,963 B2
(45) Date of Patent: Feb. 4, 2025

(54) GALVANOMETER POSITIONING TOOL AND LASER PRINTER

(71) Applicants: SMC Multi-Media Products Company Ltd., Foshan (CN); Xi'an Zhisensor Technologies Co., Ltd., Xi'an (CN)

(72) Inventors: Che Yin Tang, Foshan (CN); Yu Chuen Wong, Foshan (CN); Bojiu Chen, Foshan (CN); Shufang Wang, Foshan (CN); Xiumin Song, Xi'an (CN); Changfeng Xia, Xi'an (CN); Wei He, Xi'an (CN)

(73) Assignees: SMC Multi-Media Products Company Ltd., Foshan (CN); Xi'an Zhisensor Technologies Co., Ltd., Xi'an (CN)

( * ) Notice: Subject to any disclaimer, the term of this patent is extended or adjusted under 35 U.S.C. 154(b) by 378 days.

(21) Appl. No.: 17/813,759

(22) Filed: Jul. 20, 2022

(65) Prior Publication Data
US 2023/0221107 A1 Jul. 13, 2023

(30) Foreign Application Priority Data
Jan. 10, 2022 (CN) .......................... 202210020883

(51) Int. Cl.
*G01B 11/00* (2006.01)
*B41J 29/393* (2006.01)
*G02B 26/10* (2006.01)

(52) U.S. Cl.
CPC .......... *G01B 11/002* (2013.01); *B41J 29/393* (2013.01); *G02B 26/105* (2013.01)

(58) Field of Classification Search
CPC ...... G01B 11/002; B41J 29/393; Y02P 10/25; G03G 15/04036; G03G 15/0435; G02B 26/105
See application file for complete search history.

(56) References Cited

U.S. PATENT DOCUMENTS

| | | | |
|---|---|---|---|
| 6,008,924 A * | 12/1999 | Ikegame | G02B 26/105 359/198.1 |
| 2012/0320596 A1 * | 12/2012 | Hastings | F16M 11/125 248/346.06 |

FOREIGN PATENT DOCUMENTS

| | | |
|---|---|---|
| CN | 204771141 U | 11/2015 |
| CN | 106405787 A | 2/2017 |
| CN | 110153923 A | 8/2019 |

(Continued)

*Primary Examiner* — Hwa Andrew Lee
(74) *Attorney, Agent, or Firm* — Dorsey & Whitney LLP

(57) ABSTRACT

A galvanometer positioning tool and a laser printer. The galvanometer positioning tool includes: a base provided with a bearing surface and provided with a first concave spherical surface; a bracket placed on the bearing surface, a positioning assembly being provided on a side surface of the bracket facing the bearing surface, a galvanometer being mounted on the bracket; and a reflection center of the galvanometer located on the spherical center of the sphere where the first concave spherical surface is located. The rotation assembly includes a first rotation rod fixedly connected to the second rotation rod and rotatably connected to the base. The second rotation rod is slidably connected to the bracket, and when the first rotation rod rotates relative to the base, the first rotation rod is capable of driving the bracket to rotate with the y-axis of the galvanometer as a rotation axis.

10 Claims, 4 Drawing Sheets

(56) References Cited

FOREIGN PATENT DOCUMENTS

| CN | 210803865 U | 6/2020 |
|----|-------------|--------|
| JP | H10318240 A | 12/1998 |

* cited by examiner

60

60

GALVANOMETER POSITIONING TOOL AND LASER PRINTER

CROSS REFERENCE TO RELATED APPLICATION

This application claims priority to Chinese Patent Application No. 202210020883.7, entitled "GALVANOMETER POSITIONING TOOL AND LASER PRINTER", filed on Jan. 10, 2022, the content of which is incorporated herein by reference in its entirety.

TECHNICAL FIELD

The present disclosure relates to the technical field of laser printing, in particular to a galvanometer positioning tool and a laser printer.

BACKGROUND

Laser printers have the advantages of fast printing speed and high image quality, and are widely used printing devices at present. A laser scanning unit on the laser printer includes a laser, a scanning element and a photosensitive drum. An laser beam generated by the laser is reflected by the scanning element, and then is scanned on the photosensitive drum. The photosensitive drum cooperates with a toner cartridge to print information on papers.

A galvanometer has the characteristics of small size, low price, easy adjustment, high frequency and fast printing speed, so that the galvanometer is used as the scanning element on the laser printer, which greatly reduces a production cost of the laser printer and improves a performance of the laser printer. The galvanometer can not only reflect the laser beam, but also change a scanning path of the laser beam by changing a mounting orientation of the galvanometer. Therefore, the mounting orientation of the galvanometer greatly affects the spot position of the laser beam on the photosensitive drum, thereby affecting the precision and accuracy of a final output image.

A MEMS galvanometer is a tiny and drivable reflector based on a microelectromechanical system technology. A reflection center is provided on a mirror surface of the reflector, and the laser emits the laser beam to the reflection center, and the laser beam is reflected to the photosensitive drum through the reflection center. The MEMS galvanometer has three directions corresponding to mutually perpendicular x-axis, y-axis, and z-axis respectively. The x-axis, y-axis, and z-axis all pass through the reflection center. The x-axis and y-axis are located on the mirror surface of the reflector. The z-axis is perpendicular to the mirror surface of the reflector. The mirror surface of the reflector is symmetrical about the x-axis and the y-axis, respectively.

SUMMARY

Accordingly, in order to improve the precision and accuracy of the mounting position of the galvanometer, a galvanometer positioning tool and a laser printer are provided.

A galvanometer positioning tool includes:

a base provided with a bearing surface, wherein the bearing surface is provided with a first concave spherical surface;

a bracket placed on the bearing surface, wherein a positioning assembly is provided on a side surface of the bracket facing the bearing surface, the positioning assembly has a plurality of contact points abutted against the first concave spherical surface, a plurality of the contact points are all located on a virtual spherical surface, a spherical center of the virtual spherical surface coincides with a spherical center of a sphere where a first convex spherical surface is located, a galvanometer is mounted on the bracket, and a reflection center of the galvanometer is located on a spherical center of a sphere where the first concave spherical surface is located;

a rotation assembly including a first rotation rod and a second rotation rod, wherein the first rotation rod is fixedly connected to the second rotation rod, an axis of the first rotation rod is arranged parallel to and spaced from an axis of the second rotation rod, the axis of the first rotation rod is parallel to a y-axis of the galvanometer, the first rotation rod is rotatably connected to the base, the first rotation rod is capable of rotating relative to the base with an axis of the first rotation rod as a rotation axis, the second rotation rod is slidably connected to the bracket, and the first rotation rod is capable of driving the bracket to rotate with the y-axis of the galvanometer as a rotation axis when the first rotation rod rotates relative to the base.

In the aforementioned galvanometer positioning tool, the bracket and the base is matched with and abutted against the first convex spherical surface by the positioning assembly, such that the bracket is capable of rotating 360° in the first convex spherical surface. When the galvanometer is mounted on the bracket, the galvanometer may follow the bracket to rotate 360° relative to the base, so as to conveniently adjust a reflection angle of a reflection plane of the galvanometer. The reflection center of the galvanometer is located on the spherical center of the sphere where the first concave spherical surface is located, thus, no matter how the galvanometer 60 rotates around the x-axis, y-axis and z-axis, the reflection center of the galvanometer remains unchanged. At the same time, a rotation assembly is provided, the first rotation rod is rotatably connected to the base, and the second rotation rod is connected to the bracket. Therefore, the rotation of the galvanometer around the y-axis of the galvanometer may be adjusted by rotating the first rotation rod, which is simple in structure, easy to operate, and improves the precision and accuracy of the mounting position of the galvanometer.

In one of the embodiments, the bracket is provided with a first elastic piece, the first elastic piece is arranged spaced from the bearing surface, an end of the first elastic piece away from the bracket is provided with a first screw, the first screw is threadedly connected to the base through the first elastic piece, the first screw is not located in the first concave spherical surface, an axis of the first screw is perpendicular to the x-axis of the galvanometer, the axis of the first screw is located on a plane where the y-axis of the galvanometer and the z-axis of the galvanometer are located, and the first screw provides the first elastic piece with a force to get close to the bearing surface.

In one of the embodiments, a first convex spherical surface is provided on a side surface of the first elastic piece facing the bearing surface, the first convex spherical surface is located on a side of the first screw away from the bracket, and the first convex spherical surface is in tangential abutment with the bearing surface;

and/or, a first spacer is provided on the bearing surface, the first spacer is located on a side of the first screw away from the bracket, and the first spacer is abutted against a side surfaces of the first elastic piece facing the bearing surface.

In one of the embodiments, the base is provided with a first through hole, the first elastic piece is provided with a second through hole, the first rotation rod is capable of being inserted into the first through hole to be rotatably connected to the base, a width direction of the second through hole is parallel to the x-axis of the galvanometer, a width of the second through hole is adapted to a diameter of the second rotation rod, a length direction of the second through hole is parallel to the z-axis of the galvanometer, a length of the second through hole is greater than a diameter of the second rotation rod, the second rotation rod is capable of being inserted into the second through hole to be slidably connected to the bracket, the second rotation rod is arranged spaced from the bearing surface, and when the first rotation rod is inserted into the first through hole, the second rotation rod is capable of being inserted into the second through hole.

In one of the embodiments, the bracket is provided with a second elastic piece, the second elastic piece is arranged spaced from the bearing surface, an end of the second elastic piece away from the bracket is provided with a second screw, the second screw is threadedly connected to the base through the second elastic piece, the second screw is not located in the first concave spherical surface, an axis of the second screw is perpendicular to the z-axis of the galvanometer, the axis of the second screw is located on a plane where the x-axis of the galvanometer and the y-axis of the galvanometer are located, and the second screw provides the second elastic piece with a force to get close to the bearing surface.

In one of the embodiments, a second convex spherical surface is provided on a side surface of the second elastic piece facing the bearing surface, the second convex spherical surface is located on a side of the second screw away from the bracket, and the second convex spherical surface is in tangential abutment with the bearing surface;

and/or, a second spacer is provided on the bearing surface, the second spacer is located on a side of the second screw away from the bracket, and the second spacer is abutted against a side surfaces of the second elastic piece facing the bearing surface.

In one of the embodiments, the base is provided with a third through hole, the second elastic piece is provided with a fourth through hole, the first rotation rod is capable of being inserted into the third through hole to be rotatably connected to the base, a width direction of the fourth through hole is parallel to the z-axis of the galvanometer, a width of the second through hole is adapted to a diameter of the second rotation rod, a length direction of the second through hole is parallel to the x-axis of the galvanometer, a length of the second through hole is greater than a diameter of the second rotation rod, the second rotation rod is capable of being inserted into the fourth through hole to be slidably connected to the bracket, the second rotation rod is arranged spaced from the bearing surface, and when the first rotation rod is inserted into the first through hole the second rotation rod is capable of being inserted into the second through hole.

In one of the embodiments, the positioning assembly includes three positioning members, and the three positioning members are arranged on the bracket and spaced from each other, an end surface of the positioning member facing the bearing surface protrudes outward to form a third convex spherical surface, and the third convex spherical surface is in inscribed abutment with the first concave spherical surface.

In one of the embodiments, the bracket includes a first support plate and a second support plate, a plate surface of the first support plate and a plate surfaces of the second support plate are vertically connected, the plate surface of the first support plate is parallel to the bearing surface, the first convex spherical surface is located on a side surface of the first support plate facing the bearing surface, and the galvanometer is located on the plate surface of the second support plate;

the second support plate is provided with a plurality of positioning columns, an axial direction of the positioning columns is perpendicular to the plate surface of the second support plate, the positioning columns protrude from a side surface of the second support plate where the galvanometer is provided, circumferential surfaces of the plurality of positioning columns are abutted against a side surface of the galvanometer perpendicular to the reflection plane, such that a reflection center of the galvanometer is located at the spherical center of the sphere where the first concave spherical surface is located.

A laser printer includes a galvanometer and the aforementioned galvanometer positioning tool, the galvanometer is mounted on a bracket of the galvanometer positioning tool, and a reflection center of the galvanometer is located on a spherical center of a sphere where a first concave spherical surface of the galvanometer positioning tool is located.

In the aforementioned laser printer, the galvanometer is mounted on the galvanometer positioning tool, such that the relative position of the galvanometer and the laser may be adjusted when assembling or repairing the laser printer, so as to adjust the angle at which the galvanometer reflects the laser beam, thereby ensuring the accuracy and precision of the spotting by the laser beam on the photosensitive drum.

Reference number: 100, galvanometer positioning tool; 10, base; 11, bearing surface; 12, first concave spherical surface; 13, first spacer; 14, second spacer; 15, first through hole; 16, third through hole; 20, bracket; 21, first support plate; 22, second support plate; 23, positioning assembly; 231, positioning member; 232, third convex spherical surface; 24, first elastic piece; 241, first convex spherical surface; 242, second through hole; 25, second elastic piece; 251, second convex spherical surface; 252, fourth through hole; 30, rotation assembly; 31, first rotation rod; 32, second rotation rod; 33, operating lever; 40, first screw; 41, first gasket; 50, second screw; 51, second gasket; 60, galvanometer; 61, reflector; 62, reflection center; 63, cable storage member; 70, positioning column.

DETAILED DESCRIPTION OF THE EMBODIMENTS

The above objects, features, and advantages of the present disclosure will become more apparent by describing in detail embodiments thereof with reference to the accompanying drawings. In the following description, numerous specific details are set forth in order to provide a thorough understanding of the present disclosure. However, the present disclosure can be implemented in many other ways than those described herein, and such modifications may be made by those skilled in the art without departing from the scope of the disclosure, which is therefore not to be limited to the specific embodiments disclosed below.

A galvanometer positioning tool 100 and a laser printer provided in some embodiments of the present disclosure will be described in detail below with reference to the accompanying drawings.

Figure 4:
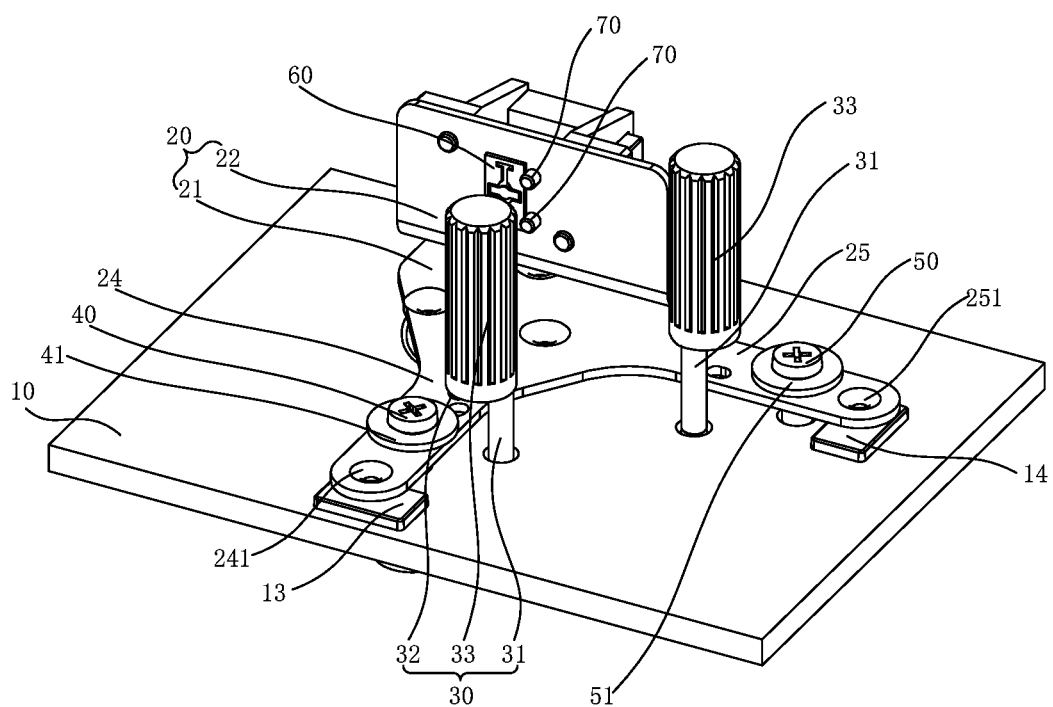
FIG. 4 is a schematic structural view of a galvanometer positioning tool in an embodiment.
Figure 5:
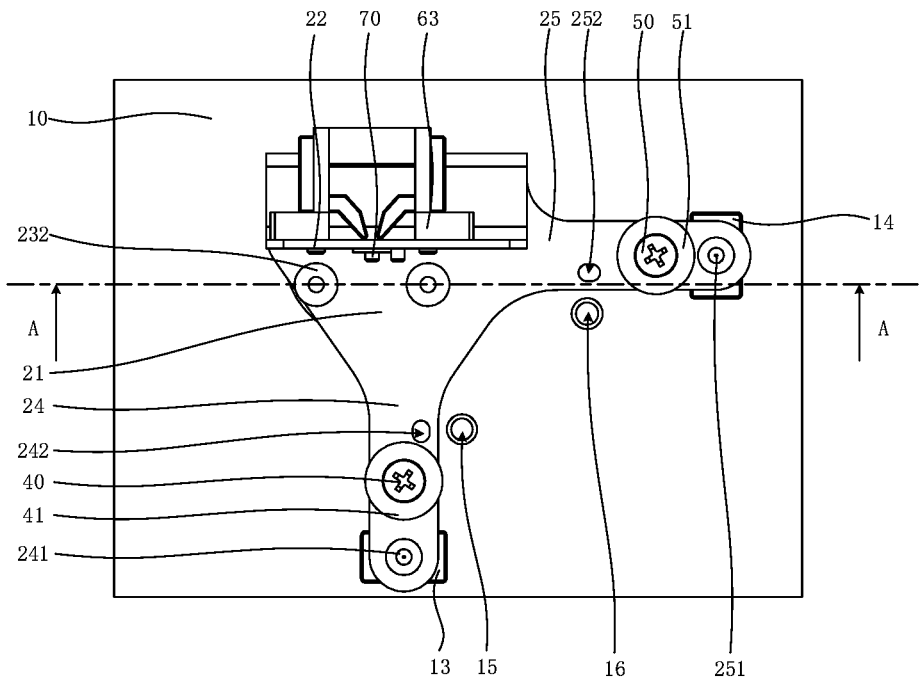
FIG. 5 is a top view of a galvanometer positioning tool in an embodiment.
Figure 6:
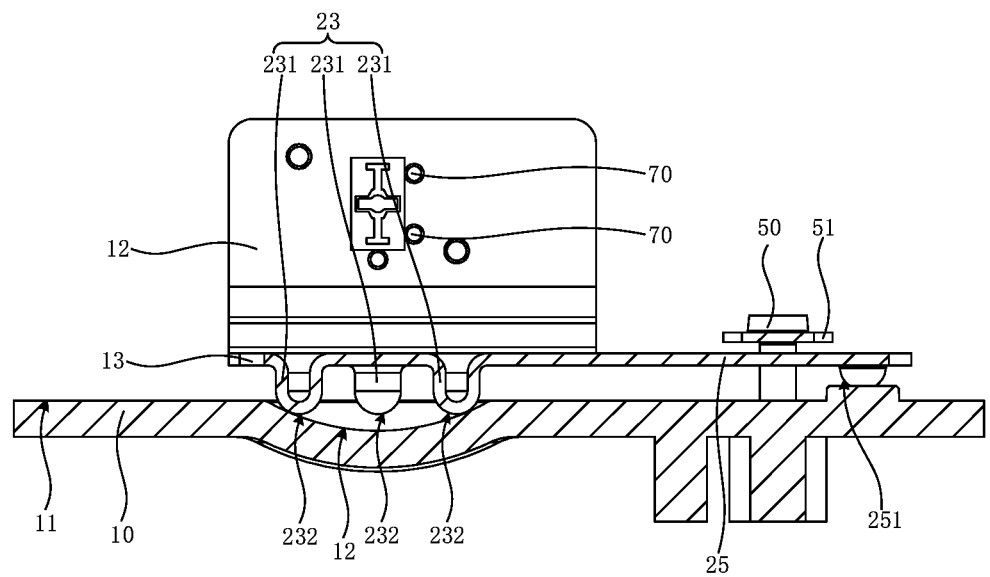
FIG. 6 is a cross-sectional view of the galvanometer positioning tool at position A-A in the embodiment of FIG. 5.

As shown in FIGS. 4, 5, and 6, in one embodiment, a galvanometer positioning tool 100 including a base 10, a bracket 20 and a rotation assembly 30 is provided;

As shown in FIG. 6, the base 10 is provided with a bearing surface 11, and the bearing surface 11 is provided with a first concave spherical surface 12.

As shown in FIG. 6, the bracket 20 is placed on the bearing surface 11, a positioning assembly 23 is provided on a side surface of the bracket 20 facing the bearing surface 11, and the positioning assembly 23 has a plurality of contact points abutted against the first concave spherical surface 12, a plurality of contact points are all located on a virtual spherical surface, and a spherical center of the virtual spherical surface coincides with a spherical center of a sphere where the first concave spherical surface 12 is located. A galvanometer 60 is mounted on the bracket 20, and the reflection center 62 of the galvanometer 60 is located on the spherical center of the sphere where the first concave spherical surface 12 is located;

As shown in FIG. 4, the rotation assembly 30 includes a first rotation rod 31 and a second rotation rod 32, the first rotation rod 31 is fixedly connected to the second rotation rod 32, an axis of the first rotation rod 31 is arranged parallel to and spaced from an axis of the second rotation rod 32, the axis of the first rotation rod 31 is parallel to a y-axis of the galvanometer 60. The first rotation rod 31 is rotatably connected to the base 10, and the first rotation rod 31 is capable of rotating relative to the base 10 with the axis of the first rotation rod as a rotation axis. The second rotation rod is slidably connected 31 to the bracket 20, and the first rotation rod 31 is capable of driving the bracket 20 to rotate with the y-axis of the galvanometer 60 as a rotation axis when the first rotation rod 31 is rotating relative to the base 10.

Figure 1:
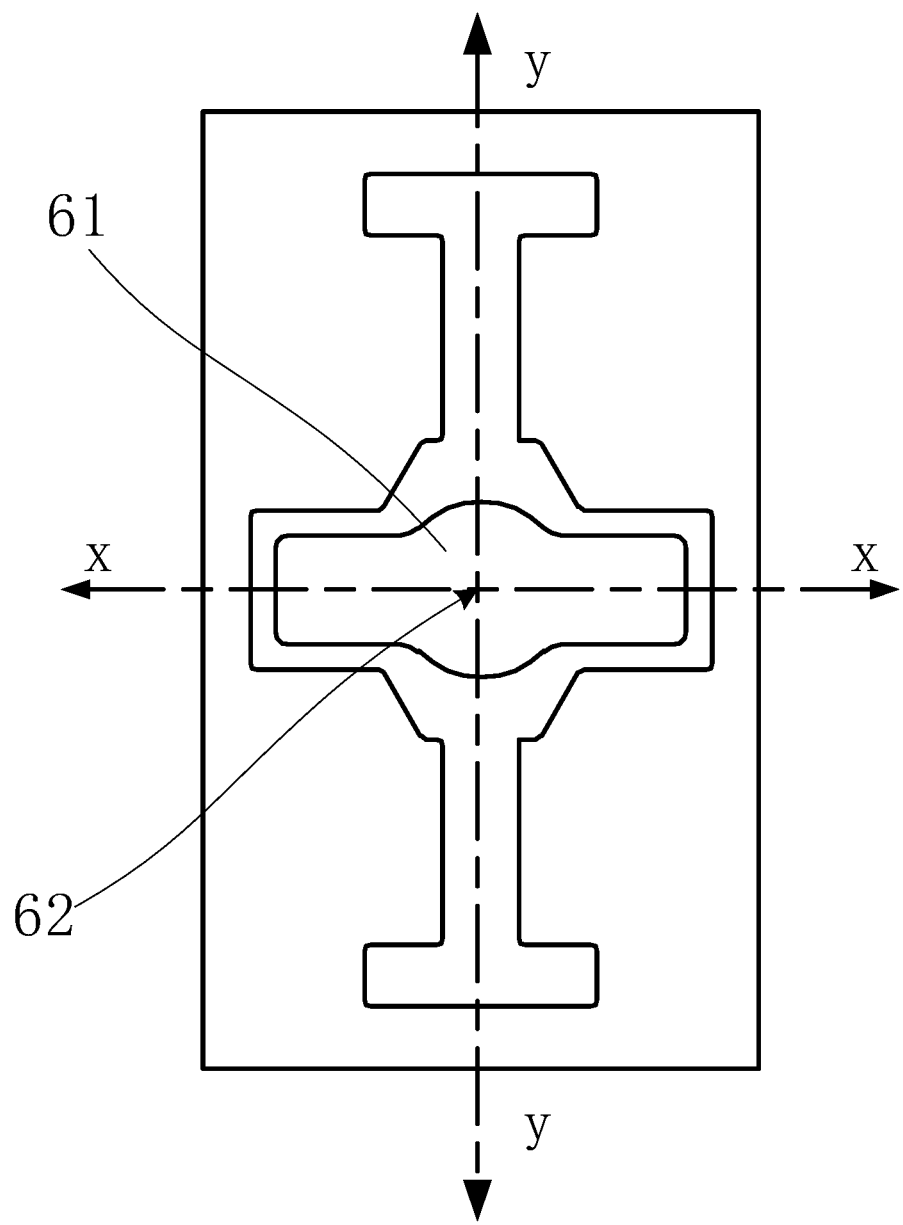
FIG. 1 is a front view of a galvanometer in an embodiment.
Figure 2:
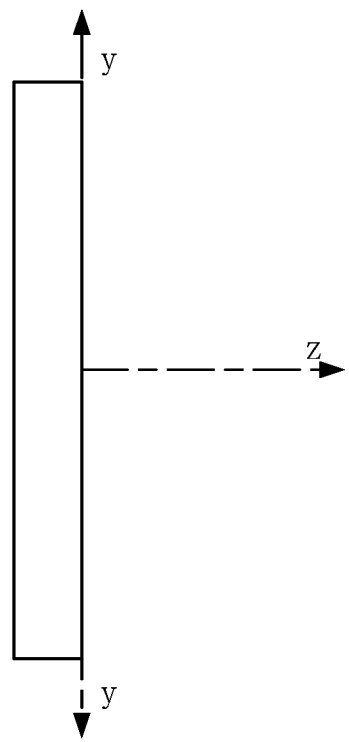
FIG. 2 is a side view of a galvanometer in an embodiment.
Figure 3:
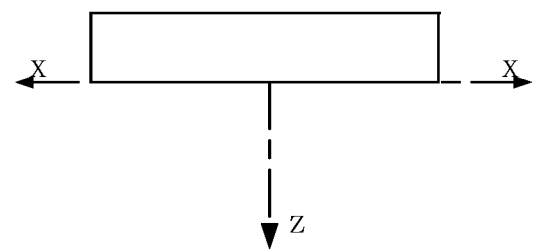
FIG. 3 is a top view of a galvanometer in an embodiment.

As shown in FIG. 1, FIG. 2 and FIG. 3, the galvanometer 60 is provided with a reflector 61, a mirror surface of the reflector 61 is provided with a reflection center 62, and the reflection center 62 is configured to receive and reflect the laser beam emitted by the laser. The galvanometer 60 is provided with three mutually perpendicular directions of an x-axis, a y-axis, and a z-axis, which all pass through the reflection center 62. The x-axis and the y-axis are located on the mirror surface of the reflector 61. The z-axis is perpendicular to the mirror surface of the reflector 61, and the mirror surface of the reflector 61 is symmetrical about the x-axis and the y-axis, respectively.

In the aforementioned galvanometer positioning tool 100, the bracket 20 and the base 10 are matched with and abutted against each other by the positioning assembly 23 and the first concave spherical surface 12, such that the bracket 20 may rotate 360° in the first concave spherical surface 12. Thus, when the galvanometer 60 is mounted on the bracket 20, the galvanometer 60 may rotate 360° relative to the base 10 along with the bracket 20, so as to conveniently adjust a reflection angle of the mirror surface of the reflector 61. The reflection center 62 of the galvanometer 60 is located on the spherical center of the sphere where the first concave spherical surface 12 is located, thus, no matter how the galvanometer 60 rotates around the x-axis, y-axis and z-axis, the reflection center 62 of the galvanometer 60 remains unchanged. At the same time, a rotation assembly 30 is provided, the first rotation rod 31 is rotatably connected to the base 10, and the second rotation rod 32 is connected to the bracket 20. Therefore, the rotation of the galvanometer 60 around the y-axis of the galvanometer 60 may be adjusted by rotating the first rotation rod 31, which is simple in structure, easy to operate, and improves the precision and accuracy of the mounting position of the galvanometer 60.

More specifically, in one embodiment, the galvanometer 60 is bonded to the bracket 20.

Specifically, as shown in FIGS. 4, 5 and 6, in an embodiment, the bracket 20 is provided with a first elastic piece 24, and the first elastic piece 24 is arranged spaced from the bearing surface 11. An end of the first elastic piece 24 away from the bracket 20 is provided with a first screw 40, the first screw 40 is threadedly connected to the base 10 through the first elastic piece 24, and the first screw 40 is not located in the first concave spherical surface 12. An axis of the first screw 40 is perpendicular to the x-axis of the galvanometer 60, the axis of the first screw 40 is located on a plane where the y-axis of the galvanometer 60 and the z-axis of the galvanometer 60 are located, and the first screw 40 provides the first elastic piece 24 with a force to get close to the bearing surface 11. Since the bracket 20 and the first screw 40 are arranged on the first elastic piece 24 and spaced from each other, when the first screw 40 provides an end of the first elastic piece 24 with a force to get close to the bearing surface 11, the other end of the first elastic piece 24 (i.e., an end of the first elastic piece 24 connected to the bracket 20) drives the bracket 20 to rotate, and the positioning assembly 23 keeps being abutted against the first concave spherical surface 12, that is, a contact point of the positioning assembly 23 and the first concave spherical surface 12 slides on the first concave spherical surface 12. Since the axis of the first screw 40 is perpendicular to the x-axis of the galvanometer 60, and is located on the plane where the y-axis of the galvanometer 60 and the z-axis of the galvanometer 60 are located, a deformation force of the first elastic piece 24 drives the bracket 20 to rotate with the x-axis as the rotation axis, and finally drives the galvanometer 60 to rotate with the x-axis as a rotation axis. Therefore, an arrangement of the first elastic piece 24 and the first screw 40 may drive the galvanometer 60 to rotate around the x-axis, thereby adjusting a scanning direction of the laser beam reflected by the galvanometer 60 to rotate around the x-axis. At the same time, the scanning direction of the galvanometer 60 is precisely adjusted by the slight deformations caused by the first screw 40 pressing against the first elastic piece 24, thereby adjusting the spot position of the laser beam on the photosensitive drum, and improving the precision and accuracy of the output image.

More specifically, as shown in FIG. 4, in an embodiment, a nut of the first screw 40 is abutted against the first elastic piece 24, and the first screw 40 provides the first elastic piece 24 with a pressing force to get close to the bearing surface 11.

More specifically, as shown in FIG. 4, in an embodiment, a first gasket 41 is provided between the nut of the first screw 40 and the first elastic piece 24. The first gasket 41 improves the reliability of the first screw 40 pressing against the first elastic piece 24 and prevents the first screw 40 from passing through the first elastic piece 24.

Specifically, as shown in FIGS. 4, 5, and 6, in an embodiment, a first convex spherical surface 241 is provided on a side surface of the first elastic piece 24 facing the bearing surface 11, the first convex spherical surface 241 is located on a side of the first screw 40 away from the bracket 20, and the first convex spherical surface 241 is in tangential abutment with the bearing surface 11. The first convex spherical surface 241 is abutted against the bearing surface 11, which ensures that the first elastic piece 24 and the bearing surface 11 are arranged spaced from each other. At the same time, since the first screw 40 is located between the first convex spherical surface 241 and the bracket 20, when the first screw 40 provides the first elastic piece 24 with a force to get close to the bearing surface 11, the first convex spherical surface 241 is continuously pressed against the bearing surface 11, the abutment position between the convex spherical surface 241 and the bearing surface 11 rotates, and the deformation of the first elastic piece 24 drives the bracket 20 to rotate around the x-axis.

Specifically, as shown in FIGS. 4, 5, and 6, in an embodiment, a first spacer 13 is provided on the bearing surface 11, the first spacer 13 is located on the side of the first screw 40 away from the bracket 20, the first spacer 13 is abutted against a side surface of the first elastic piece 24 facing the bearing surface 11. The first gasket 41 is configured to ensure that the first elastic piece 24 and the bearing surface 11 are arranged spaced, and to fix the spacing position between the first elastic piece 24 and the base 10.

More specifically, as shown in FIG. 4 and FIG. 6, in an embodiment, a first convex spherical surface 241 is provided on a side surface of the first elastic piece 24 facing the bearing surface 11, and the first convex spherical surface 241 is located on the side of the first screw 40 away from the bracket 20, the bearing surface 11 is provided with a first spacer 13, the first spacer 13 is located on a side of the first screw 40 away from the bracket 20, the first spacer 13 is located between the first convex spherical surface 241 and the bearing surface 11, and the first convex spherical surface 241 is in tangential abutment with the first spacer 13. The first convex spherical surface 241 and the first spacer 13 increase a distance between the first elastic piece 24 and the bearing surface 11, and expand the deformation space of the first elastic piece 24 when the first screw 40 is pressed against the first elastic piece 24, thereby enlarging the rotatable angle of the galvanometer 60 around the x-axis.

Specifically, as shown in FIG. 5, in an embodiment, the base 10 is provided with a first through hole 15, and the first rotation rod 31 is capable of being inserted into the first through hole 15 to be rotatably connected to the base 10.

Specifically, as shown in FIG. 5, in an embodiment, the first elastic piece 24 is provided with a second through hole 242. A width direction of the second through hole 242 is parallel to the x-axis of the galvanometer 60, and a width of the second through hole 242 is adapted to a diameter of the second rotation rod 32. A length direction of the second through hole 242 is parallel to the z-axis of the galvanometer 60, and a length of the second through hole 242 is greater than the diameter of the second rotation rod 32. The second rotation rod 32 is capable of being inserted into the second through hole 242 to be slidably connected to the bracket 20, and the second rotation rod 32 is arranged spaced from the bearing surface 11.

Specially, as shown in FIG. 5, in an embodiment, the base 10 is provided with a first through hole 15, the first elastic piece 24 is provided with a second through hole 242, and the first rotation rod 31 is capable of being inserted into the first through hole 15 to be rotatably connected to the base 10. A width direction of the second through hole 242 is parallel to the x-axis of the galvanometer 60, and a width of the second through hole 242 is adapted to a diameter of the second rotation rod 32. A length direction of the second through hole 242 is parallel to the z-axis of the galvanometer 60, and a length of the second through hole 242 is greater than the diameter of the second rotation rod 32. The second rotation rod 32 is capable of being inserted into the second through hole 242 to be slidably connected to the bracket 20, the second rotation rod 32 is arranged spaced from the bearing surface 11. When the first rotation rod 31 is inserted into the first through hole 15, the second rotation rod 32 is capable of being inserted into the second through hole 242. The first rotation rod 31 is operated to rotate in the first through hole 15, and since the length direction of the second through hole 242 is parallel to the z-axis of the galvanometer 60, and a motion trail of the second rotation rod 32 rotating around the first rotation rod 31 is circular arc, thus, when the second rotation rod 32 slides in the second through hole 242 along the length direction of the second through hole 242, the second rotation rod 32 generates a force parallel to the x-axis, such that the first elastic piece 24 is deformed along the x-axis, thereby driving the bracket 20 to rotate with the y-axis as the rotation axis and adjusting the initial position of the laser beam reflected by the galvanometer 60 on the photosensitive drum. Therefore, when the galvanometer 60 is mounted, the reflection path of the galvanometer 60 may be adjusted by rotating the first rotation rod 31, which is simple in operation. In addition, the rotation of the galvanometer 60 around the y-axis is realized by slight deformations of the first elastic piece 24, which improves the adjustment accuracy of the galvanometer 60 and the precision and accuracy of the image output by the laser printer.

Alternatively, in an embodiment, the base 10 is provided with a first through hole 15, the bracket 20 is provided with a second through hole 242. The first rotation rod 31 is capable of being inserted into the first through hole 15 to be rotatably connected to the base 10. A width direction of the second through hole 242 is parallel to the x-axis of the galvanometer 60, and a width of the second through hole 242 is adapted to a diameter of the second rotation rod 32. A length direction of the second through hole 242 is parallel to the z-axis of the galvanometer 60, and a length of the second through hole 242 is greater than the diameter of the second rotation rod 32. The second rotation rod 32 is capable of being inserted into the second through hole 242 to be slidably connected to the bracket 20, the second rotation rod 32 is arranged spaced from the bearing surface 11, and when the first rotation rod 31 is inserted into the first through hole 15, the second rotation rod 32 is capable of being inserted into the second through hole 242.

More specifically, the rotation assembly 30 further includes an operating rod 33. The first rotation rod 31 and the second rotation rod 32 are respectively connected to an end surface of the operating rod 33 that are close to the bearing surface 11. The first rotation rod 31 and the second rotation rod 32 are arranged spaced from each other on the end surface of the operating rod 33 close to the bearing surface 11. The operator may drive the first rotation rod 31 to rotate in the first through hole 15 and drive the second rotation rod 32 to slide in the second through hole 242, by rotating the operating rod 33.

Specifically, as shown in FIGS. 4, 5, and 6, in an embodiment, the bracket 20 is provided with a second elastic piece 25. The second elastic piece 25 is arranged spaced from the bearing surface 11. An end of the second elastic piece 25 away from the bracket 20 is provided with a second screw 50, and the second screw 50 is threadedly connected to the base 10 through the second elastic piece. The second screw 50 is not located in the first concave spherical surface 12, an axis of the second screw 50 is perpendicular to the z-axis of the galvanometer 60, and the axis of the second screw 50 is located on the plane where the x-axis of the galvanometer 60 and the y-axis of the galvanometer 60 are located. The second screw 50 provides the second elastic piece 25 with a force to get close to the bearing surface 11. The bracket 20 and the second screw 50 are arranged on both ends of the first elastic piece 25, respectively, when the second screw 50 provides an end of the second elastic piece 25 with a force to get close to the bearing surface 11, the other end of the second elastic piece 25 (i.e., an end of the second elastic piece 25 connected to the bracket 20) drives the bracket 20 to rotate, and the positioning assembly 23 continuously keeps being abutted against the first concave spherical surface 12, that is, a contact point of the positioning assembly 23 and the first concave spherical surface 12 slides on the first concave spherical surface 12. Since the axis of the first screw 40 is perpendicular to the z-axis of the galvanometer 60, and is located on a plane where the x-axis of the galvanometer 60 and the y-axis of the galvanometer 60 are located, the deformation force of the second elastic piece 25 drives the bracket 20 to rotate with the z-axis as a rotation axis and finally drives the galvanometer 60 to rotate with the z-axis as the rotation axis. Therefore, an arrangement of the first elastic piece 24 and the first screw 40 is capable of driving the galvanometer 60 to rotate around the z-axis, thereby adjusting the scanning direction of the laser beam reflected by the galvanometer 60 to rotate around the z-axis. At the same time, the inclination angle of the laser beam reflected by the galvanometer 60 is precisely adjusted via the slight deformations of the first elastic piece 24, thereby improving the precision and accuracy of the output image.

More specifically, as shown in FIG. 4, in an embodiment, a nut of the second screw 50 is abutted against the second elastic piece 25, and the second screw 50 provides the second elastic piece 25 with a pressing force to get close to the bearing surface 11.

More specifically, as shown in FIG. 4, in an embodiment, a second gasket 51 is provided between the nut of the second screw 50 and the second elastic piece 25. The second gasket 51 improves the reliability of the second screw 50 pressing against the second elastic sheet 25, and prevents the second screw 50 from passing through the second elastic piece 25.

Specifically, as shown in FIGS. 4, 5 and 6, in an embodiment, a second convex spherical surface 251 is provided on a side surface of the second elastic piece 25 facing the bearing surface 11, the second convex spherical surface 251 is located on a side of the second screw 50 away from the bracket 20, and the second convex spherical surface 251 is in tangential abutment against the bearing surface 11. The second convex spherical surface 251 is abutted against the bearing surface 11, which ensures that the second elastic piece 25 and the bearing surface 11 are arranged spaced from each other. At the same time, since the second screw 50 is located between the second convex spherical surface 251 and the bracket 20, when the second screw 50 provides the second elastic piece 25 with a force to get close to the bearing surface 11, the second convex spherical surface 251 continuously presses against the bearing surface 11, the abutment position between the second convex spherical surfaces 251 and the bearing surface 11 rotates, and the deformation of the second elastic piece 25 drives the bracket 20 to rotate around the z-axis.

Specifically, as shown in FIGS. 4, 5, and 6, in an embodiment, a second spacer 14 is provided on the bearing surface 11, the second spacer 14 is located on a side of the second screw 50 away from the bracket 20, the second spacer 14 is abutted against the side surface of the second elastic piece facing the bearing surface 11. The second gasket 51 is configured to ensure that the second elastic piece 25 and the bearing surface 11 are arranged spaced, which improves a support for the second elastic piece 25.

More specifically, as shown in FIGS. 4 6, in an embodiment, a second convex spherical surface 251 is provided on the side surface of the second elastic piece 25 facing the bearing surface 11, the second convex spherical surface 251 is located on the side of the bracket 20 away from the second screw 50. The bearing surface 11 is provided with a second spacer 14, the second spacer 14 is located on the side of the second screw 50 away from the bracket 20, the second spacer 14 is located between the second convex spherical surface 251 and the bearing surface 11, and the second convex spherical surface 251 is in tangential abutment against the second spacer 14. The second convex spherical surface 251 and the second spacer 14 increase a distance between the first elastic piece 24 and the bearing surface 11, and expand the deformation space of the second elastic piece 25 when the second screw 50 presses against the second elastic piece 25, thereby enlarging the rotatable angle of the galvanometer 60 around the z-axis.

Specifically, as shown in FIG. 5, in an embodiment, the base 10 is provided with a third through hole 16, and the first rotation rod 31 is capable of being inserted into the third through hole 16 to be rotatably connected to the base 10.

Specifically, as shown in FIG. 5, in an embodiment, the second elastic piece 25 is provided with a fourth through hole 252. A width direction of the fourth through hole 252 is parallel to the z-axis of the galvanometer 60, and the width of the second through hole 242 is adapted to the diameter of the second rotation rod 32. The length direction of the second through hole 242 is parallel to the x-axis of the galvanometer 60, and the length of the second through hole 242 is greater than the diameter of the second rotation rod 32. The second rotation rod 32 is capable of being inserted into the fourth through hole 252 to be slidably connected to the bracket 20, and the second rotation rod 32 is arranged spaced from the bearing surface 11.

Specifically, as shown in FIG. 5, in an embodiment, the base 10 is provided with the third through hole 16, the second elastic piece 25 is provided with the fourth through hole 252, and the first rotation rod 31 is capable of being inserted into the third through hole 16 to be rotatably connected to the base 10, the width direction of the fourth through hole 252 is parallel to the z-axis of the galvanometer 60, and the width of the second through hole 242 is adapted to the diameter of the second rotation rod 32. The length direction of the second through hole 242 is parallel to the x-axis of the galvanometer 60, and the length of the second through hole 242 is greater than the diameter of the second rotation rod 32. The second rotation rod 32 is capable of being inserted into the fourth through hole 252 to be slidably connected to the bracket 20. The second rotation rod 32 is arranged spaced from the bearing surface 11, and when the first rotation rod 31 is inserted into the first through hole 15, the second rotation rod 32 is capable of being inserted into the second through hole 242. The first rotation rod 31 is operated to rotate in the third through hole 16, and since the length direction of the fourth through hole 252 is parallel to the x-axis of the galvanometer 60, and the motion trail of the second rotation rod 32 rotates around the first rotation rod 31 is circular arc, when the second rotation rod 32 slides in the second through hole 242 along the length direction of the second through hole 242, the second rotation rod 32 will generate a force parallel to the z-axis, such that the first elastic piece 24 is deformed along the z-axis, thereby driving the bracket 20 to rotate with the y-axis as the rotation axis, and adjusting the initial position of the laser beam reflected by the galvanometer 60 on the photosensitive drum. Therefore, when the galvanometer 60 is mounted, the reflection path of the galvanometer 60 may be adjusted by rotating the first rotation rod 31, and the operation is simple. In addition, the rotation of the galvanometer 60 around the y-axis is realized by slight deformations of the first elastic piece 24, which improves the adjustment accuracy of the galvanometer 60 and improves the precision and accuracy of the image output by the laser printer.

Further specifically, as shown in FIGS. 4, 5, and 6, in an embodiment, the bracket 20 is provided with a first elastic piece 24, the first elastic piece 24 is arranged spaced from the bearing surface 11, and an end of the first elastic piece 24 away from the bracket 20 is provided with a first screw 40. The first screw 40 is threadedly connected to the base 10 through the first elastic piece 24, the first screw 40 is not located in the first concave spherical surface 12, and the axis of the first screw 40 is perpendicular to the x-axis of the galvanometer 60. The axis of the first screw 40 is located on the plane formed by the y-axis of the galvanometer 60 and the z-axis of the galvanometer 60. The first screw 40 provides the first elastic piece 24 with a force to get close to the bearing surface 11. The bracket 20 is provided with a second elastic piece 25 arranged spaced from the bearing surface 11. The end of the second elastic piece 25 away from the bracket 20 is provided with a second screw 50, and the second screw 50 is threadedly connected to the base 10 through the second elastic piece 25. The second screw 50 is not located on the first concave spherical surface 12, an axis of the second screw 50 is perpendicular to the z-axis of the galvanometer 60, the axis of the second screw 50 is located on the plane formed by the x-axis of the galvanometer 60 and the y-axis of the galvanometer 60, and the second screw 50 provides the second elastic piece 25 with a force to get close to the bearing surface 11.

More specifically, as shown in FIGS. 4, 5, and 6, in an embodiment, two rotating assemblies 30 are provided, and the two rotating assemblies 30 are slidably connected to the first elastic piece 24 and the second elastic piece 25, respectively. One of the two rotation assemblies 30 is configured to adjust the galvanometer 60 to rotate clockwise around the y-axis, and the other rotation assembly 30 is configured to adjust the galvanometer 60 to rotate counterclockwise around the y-axis.

Specifically, as shown in FIGS. 4, 5, and 6, in an embodiment, the positioning assembly 23 includes three positioning members 231, and the three positioning members 231 are arranged on the bracket 20 and spaced from each other. The end surface of the positioning members 231 facing the bearing surface 11 protrudes outward to form a third convex spherical surface 232, and the third convex spherical surface 232 is in inscribed abutment against the first concave spherical surface 12.

Alternatively, in an embodiment, the positioning assembly 23 includes a fourth convex spherical surface, the fourth convex spherical surface is in contact with and abutted against the first concave spherical surface 12, and a spherical center of a sphere where the fourth convex spherical surface is located is coincident with the spherical center of the sphere where the first concave spherical surface 12 is located.

Specifically, as shown in FIGS. 4, 5, and 6, in an embodiment, the bracket 20 includes a first support plate 21 and a second support plate 22, a plate surface of the first support plate 21 and a plate surface of the second support plate 22 are vertically connected, the plate surface of the first support plate 21 is parallel to the bearing surface 11, the first convex spherical surface 241 is located on a side surface of the first support plate 21 facing the bearing surface 11, and the galvanometer 60 is located on the plate surface of the second support plate 22. The first support plate 21 and the second support plate 22 can ensure that the mirror surface of the reflector 61 is perpendicular to the bearing surface 11 of the base 10 in the initial position, such that the relative position between the mirror surface of the reflector 61 and the bearing surface 11 may be adjusted with the bearing surface 11 as a reference.

More specifically, as shown in FIGS. 4, 5, and 6, in an embodiment, the first support plate, the first elastic piece and the second elastic piece are integrally formed. The first support plate, the first elastic piece and the second elastic piece are stainless steel stamping members.

More specifically, as shown in FIG. 5, in an embodiment, a cable storage member 63 is provided on a side surface of the first support plate away from the galvanometer. The cable storage member 63 is configured to store the connecting cable of the galvanometer 60 to prevent the cable from interfering with the orientation adjustment of the galvanometer 60.

More specifically, as shown in FIGS. 4, 5, and 6, in an embodiment, the second support plate 22 is provided with a plurality of positioning columns 70, and an axial direction of the positioning columns 70 is perpendicular to the plate surface of the second support plate 22. The positioning column 70 protrudes from a side surface of the second support plate 22 where the galvanometer 60 is provided, and circumferential surfaces of the plurality of positioning columns 70 are abutted against the side surface of the galvanometer 60 that is perpendicular to the reflection plane, such that the reflection center 62 of the galvanometer 60 is located on the spherical center of the sphere where the first concave spherical surface 12 is located.

Further specifically, as shown in FIGS. 4, 5, and 6, the circumferential surfaces of a part of the positioning columns 70 are abutted against a first side of the galvanometer 60, and the circumferential surfaces of another part of the positioning columns 70 are abutted against a second side of the galvanometer 60. The first side of the galvanometer 60 and the second side of the galvanometer 60 are perpendicular to each other, and are both perpendicular to the mirror surface of the reflector 61. In the process of mounting the galvanometer 60 on the bracket 20, the galvanometer 60 is abutted against the circumferential surfaces of the plurality of positioning columns 70 to ensure that the reflection center 62 of the galvanometer 60 is located on the spherical center of the sphere where the first concave spherical surface 12 is located, which simplifies the mounting process of the galvanometer 60.

Further specifically, as shown in FIGS. 4, 5, and 6, three positioning columns 70 are provided, the circumferential surfaces of the two positioning columns are abutted against the first side of the galvanometer 60, and the circumferential surface of the other positioning column 70 is abutted against the second side of the galvanometer 60.

As shown in FIGS. 4, 5, and 6, in an embodiment, a laser printer includes a galvanometer 60 and a galvanometer positioning tool 100, the galvanometer 60 is mounted on the bracket 20 of the galvanometer positioning tool 100, and the reflection center 62 of the galvanometer 60 is located on the spherical center of the sphere where the first concave spherical surface 12 of the galvanometer positioning tool 100 is located.

In the aforementioned laser printer, the galvanometer 60 is mounted on the galvanometer positioning tool 100, so that the relative position of the galvanometer 60 and the laser may be adjusted when assembling or repairing the laser printer, thereby adjusting the angle of the laser beam reflected by the galvanometer 60 and ensuring the accuracy and precision of the image output by the laser printer.

Specifically, in an embodiment, the galvanometer 60 is a MEMS galvanometer.

In the description of the present disclosure, it should be understood that the orientations or positional relationships indicated by the terms "center", "longitudinal", "lateral", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientations or positional relationships shown in the accompanying drawings, which is only intended to facilitate the description the present disclosure and simplify the description, is not intended to indicate or imply the indicated device or elements must have a particular orientation, or be constructed and operated in a particular orientation, and therefore should not to be construed as limitations of the present disclosure.

In addition, the terms "first" and "second" are only used for descriptive purposes, and should not be construed as indicating or implying relative importance or implying the number of indicated technical features. Thus, a feature defined with "first" or "second" may expressly or implicitly include at least one of that feature. In the description of the present disclosure, "plurality" means at least two, such as two, three, etc., unless otherwise expressly and specifically defined.

In the present disclosure, unless otherwise expressly specified and limited, the terms "mounted", "connected together", "connected", "fixed", etc. should be understood in a broad sense, for example, it may be a fixed connection or a detachable connection, or an integrated body; it may be a mechanical connection or an electrical connection; it may be a direct connection or an indirect connection through an intermediate medium; and it may be an internal communication of two elements or an interaction relationship between the two elements, unless otherwise specified limit. For those of ordinary skill in the art, the specific meanings of the above terms in the present disclosure can be understood according to specific situations.

In the present disclosure, unless otherwise expressly specified and limited, a first feature being "on" or "under" a second feature may refer to that the first feature is in direct contact with the second feature, or the first feature is in indirect contact with the second feature through an intermediate medium. Also, the first feature being "above", "over" and "on" the second feature may refer to that the first feature is directly above or obliquely above the second feature, or may simply refer to that the first feature has a higher level than the second feature. The first feature being "below", "beneath" and "under" the second feature may refer to that the first feature is directly or obliquely below the second feature, or may simply refer to that the first feature has a lower level than the second feature.

It should be noted that when an element is referred to as being "fixed to" or "disposed on" another element, it can be directly on the other element or an intervening element may also be present. When an element is considered to be "connected" to another element, it can be directly connected to another element or indirectly connected to another element with a mediating element. The terms "vertical", "horizontal", "upper", "lower", "left", "right" and similar expressions used herein are for the purpose of illustration only and do not represent the only embodiment.

The technical features of the above-described embodiments may be combined arbitrarily. To simplify the description, not all the possible combinations of the technical features in the above embodiments are described. However, all of the combinations of these technical features should be considered as within the scope of this disclosure, as long as such combinations do not contradict with each other.

The above embodiments only represent several examples of the present disclosure, and the description thereof is more specific and detailed, but it should not be construed as restricting the scope of the present disclosure. It should be noted that, for those skilled in the art, several variations and improvements may be made without departing from the concept of the present disclosure, and these are all within the protection scope of the present disclosure. Therefore, the protection scope of this disclosure shall be defined by the appended claims.

What is claimed is:

1. A galvanometer positioning tool, comprising:
   a base provided with a bearing surface, wherein the bearing surface is provided with a first concave spherical surface;
   a bracket placed on the bearing surface, wherein a positioning assembly is provided on a side surface of the bracket facing the bearing surface, the positioning assembly has a plurality of contact points abutted against the first concave spherical surface, the plurality of contact points are located on a virtual spherical surface, a spherical center of the virtual spherical surface coincides with a spherical center of a sphere where the first concave spherical surface is located, a galvanometer is mounted on the bracket, and a reflection center of the galvanometer is located on the spherical center of the sphere where the first concave spherical surface is located; and
   a rotation assembly comprising a first rotation rod and a second rotation rod, wherein the first rotation rod is fixedly connected to the second rotation rod, an axis of the first rotation rod is arranged parallel to and spaced from an axis of the second rotation rod, the axis of the first rotation rod is parallel to a y-axis of the galvanometer, the first rotation rod is rotatably connected to the base, the first rotation rod is capable of rotating relative to the base with the axis of the first rotation rod as a rotation axis, the second rotation rod is slidably connected to the bracket, and when the first rotation rod rotates relative to the base, the first rotation rod is capable of driving the bracket to rotate with the y-axis of the galvanometer as a rotation axis.

2. The galvanometer positioning tool of claim 1, wherein the bracket is provided with a first elastic piece, the first elastic piece is arranged spaced from the bearing surface, an end of the first elastic piece away from the bracket is provided with a first screw, the first screw is threadedly connected to the base through the first elastic piece, the first screw is not located in the first concave spherical surface, an axis of the first screw is perpendicular to a x-axis of the galvanometer, the axis of the first screw is located on a plane where the y-axis of the galvanometer and a z-axis of the galvanometer are located, and the first screw provides the first elastic piece with a force to get close to the bearing surface.

3. The galvanometer positioning tool of claim 2, wherein a first convex spherical surface is provided on a side surface of the first elastic piece facing the bearing surface, the first convex spherical surface is located on a side of the first screw away from the bracket, and the first convex spherical surface is in tangential abutment with the bearing surface;

and/or, a first spacer is provided on the bearing surface, the first spacer is located on a side of the first screw away from the bracket, and the first spacer is abutted against a side surface of the first elastic piece facing the bearing surface.

4. The galvanometer positioning tool of claim 2, wherein the base is provided with a first through hole, the first elastic piece is provided with a second through hole, the first rotation rod is capable of being inserted into the first through hole to be rotatably connected to the base, a width direction of the second through hole is parallel to the x-axis of the galvanometer, a width of the second through hole is adapted to a diameter of the second rotation rod, a length direction of the second through hole is parallel to the z-axis of the galvanometer, a length of the second through hole is greater than a diameter of the second rotation rod, the second rotation rod is capable of being inserted into the second through hole to be slidably connected to the bracket, the second rotation rod is arranged spaced from the bearing surface, and when the first rotation rod is inserted into the first through hole, the second rotation rod is capable of being inserted into the second through hole.

5. The galvanometer positioning tool of claim 1, wherein the bracket is provided with a second elastic piece, the second elastic piece is arranged spaced from the bearing surface, an end of the second elastic piece away from the bracket is provided with a second screw, the second screw is threadedly connected to the base through the second elastic piece, the second screw is not located in the first concave spherical surface, an axis of the second screw is perpendicular to a z-axis of the galvanometer, the axis of the second screw is located on a plane where a x-axis of the galvanometer and the y-axis of the galvanometer are located, and the second screw provides the second elastic piece with a force to get close to the bearing surface.

6. The galvanometer positioning tool of claim 5, wherein a second convex spherical surface is provided on a side surface of the second elastic piece facing the bearing surface, the second convex spherical surface is located on a side of the second screw away from the bracket, and the second convex spherical surface is in tangential abutment with the bearing surface;

and/or, a second spacer is provided on the bearing surface, the second spacer is located on a side of the second screw away from the bracket, and the second spacer is abutted against a side surface of the second elastic piece facing the bearing surface.

7. The galvanometer positioning tool of claim 5, wherein the base is provided with a third through hole, the second elastic piece is provided with a fourth through hole, the first rotation rod is capable of being inserted into the third through hole to be rotatably connected to the base, a width direction of the fourth through hole is parallel to the z-axis of the galvanometer, a width of the second through hole is adapted to a diameter of the second rotation rod, a length direction of the second through hole is parallel to the x-axis of the galvanometer, a length of the second through hole is greater than the diameter of the second rotation rod, the second rotation rod is capable of being inserted into the fourth through hole to be slidably connected to the bracket, the second rotation rod is arranged spaced from the bearing surface, and when the first rotation rod is inserted into the first through hole, the second rotation rod is capable of being inserted into the second through hole.

8. The galvanometer positioning tool of claim 1, wherein the positioning assembly comprises three positioning members, and the three positioning members are arranged on the bracket and spaced from each other, an end surface of the positioning member facing the bearing surface protrudes outward to form a third convex spherical surface, and the third convex spherical surface is in inscribed abutment with the first concave spherical surface.

9. The galvanometer positioning tool of claim 1, wherein the bracket comprises a first support plate and a second support plate, a plate surface of the first support plate and a plate surfaces of the second support plate are vertically connected, the plate surface of the first support plate is parallel to the bearing surface, the first convex spherical surface is located on a side surface of the first support plate facing the bearing surface, and the galvanometer is located on the plate surface of the second support plate, wherein the second support plate is provided with a plurality of positioning columns, an axial direction of the positioning columns is perpendicular to the plate surface of the second support plate, the positioning columns protrude from a side surface of the second support plate where the galvanometer is provided, circumferential surfaces of the plurality of positioning columns are abutted against the side surface of the galvanometer perpendicular to a reflection plane, such that a reflection center of the galvanometer is located on the spherical center of the sphere where the first concave spherical surface is located.

10. A laser printer, comprising a galvanometer and the galvanometer positioning tool of claim 1, the galvanometer is mounted on a bracket of the galvanometer positioning tool, and a reflection center of the galvanometer is located on a spherical surface of a sphere where a first concave spherical surface of the galvanometer positioning tool is located.

* * * * *